UNITED STATES PATENT OFFICE.

JAMES D. SIMMONS, OF HAGERSTOWN, MARYLAND.

PHOSPHATIC FERTILIZER.

SPECIFICATION forming part of Letters Patent No. 432,091, dated July 15, 1890.

Application filed February 8, 1890. Serial No. 339,717. (Specimens.)

*To all whom it may concern:*

Be it known that I, JAMES D. SIMMONS, a citizen of the United States, residing at Hagerstown, in the county of Washington and State of Maryland, have invented certain new and useful Improvements in Fertilizers; and I do hereby declare the following to be a full, clear, and exact description of the invention, such as will enable others to make and use the same.

This invention relates to improvements in fertilizers; and it consists in combining the following ingredients and thoroughly mixing the same before the fertilizer is used.

My fertilizer consists in the following ingredients, combined in or about the proportions stated, viz: wood-ashes, six hundred pounds; phosphate of lime, nine hundred pounds; muriate of potash, two hundred pounds; pulverized sulphur, two hundred pounds; nitrate of soda, one hundred pounds. The above ingredients are mixed together by means of a shovel, rollers, and sieve, so that they are thoroughly intermingled in one common mass. The compound is then applied to the plant by means of a hoe, drilled into the ground by means of a fertilizer-distributer, or harrowed into ground after having been thrown upon the same by a shovel or otherwise.

The above composition, when used upon fruit-trees, vines, and all plants, produces health and growth of the same and large and most delicious fruit, and will be found an excellent fertilizer for young trees and vines. At the same time rapid growth of the vines or trees is encouraged, and when used on fruit-trees the fruit is caused to become of an excellent color and fine flavor, especially peaches. It protects the fruit from the rot, as well as from fungus and parasite, and thereby produces solid fruit, the composition being inexpensive and easily and quickly applied.

What I claim is—

The herein-described fertilizer, consisting of wood-ashes, phosphate of lime, muriate of potash, pulverized sulphur, and nitrate of soda, the whole combined and in about the proportions specified.

In testimony whereof I affix my signature in presence of two witnesses.

JAMES D. SIMMONS.

Witnesses:
E. H. BATES,
M. P. CALLAN.